United States Patent [19]
Berke et al.

[11] Patent Number: 4,806,918
[45] Date of Patent: Feb. 21, 1989

[54] GRAPHICS TABLET USING A PERMUTED TRACE ORDERING SCHEME

[75] Inventors: W. Mike Berke; Thomas Malzbender, both of Sunnyvale, Calif.

[73] Assignee: Hewlett-Packard Company, Palo Alto, Calif.

[21] Appl. No.: 42,544

[22] Filed: Apr. 24, 1987

Related U.S. Application Data

[63] Continuation of Ser. No. 718,928, Apr. 1, 1985, abandoned.

[51] Int. Cl.$^4$ ............................................. G09G 3/00
[52] U.S. Cl. ................................... 340/712; 340/707; 178/18
[58] Field of Search ........... 340/712, 711, 706, 365 R, 340/707, 708; 178/18, 17 C

[56] References Cited

U.S. PATENT DOCUMENTS

| | | | |
|---|---|---|---|
| 3,342,935 | 9/1967 | Leifer et al. | 340/805 |
| 3,975,592 | 8/1976 | Carvey | 178/18 |
| 4,205,199 | 5/1980 | Mochizuki | 178/18 |
| 4,213,005 | 7/1980 | Cameron | 178/18 |
| 4,255,617 | 3/1981 | Carau, Sr. et al. | 178/18 |
| 4,477,877 | 10/1984 | Nakamura et al. | 178/18 |
| 4,534,060 | 8/1985 | Ward | 178/18 |
| 4,560,830 | 12/1985 | Perl | 178/19 |
| 4,577,057 | 3/1986 | Blesser | 178/18 |

OTHER PUBLICATIONS

"A High-Quality, Low-Cost Graphics Tablet", Stavely, Donald J., Jan. 1981, Hewlett-Packard Journal, pp. 15-24.

"Easy-to-Use, High-Resolution Digitizer Increases Operator Efficiency" Carau, Frank P., Dec. 1978, Hewlett-Packard Journal, pp. 2-13.

*Primary Examiner*—Marshall M. Curtis
*Assistant Examiner*—Mahmoud Fatahi-yar

[57] ABSTRACT

A graphics tablet is presented which has an x-y grid of wire traces embedded on it. Drive wires are coupled to the trace wires in both the x-direction and the y-direction. When a stylus is placed in contact with the graphics tablet, the location of a sector of the graphics tablet where the stylus contacts the graphics tablet may be determined by sequentially placing a signal on each drive wire and measuring the strength of the signal received by the stylus. The closer the stylus is to a particular trace, the stronger the signal which is received by the stylus from the drive wire coupled to that trace. The identity of a plurality of drive wires in the x-direction and a plurality of wires in the y-direction with the strongest received signal can be used to determine a unique address for the location of the sector of the graphics tablet where the stylus contacts the graphics tablet.

7 Claims, 3 Drawing Sheets

GRAPHICS TABLET USING A PERMUTED TRACE ORDERING SCHEME

CROSS REFERENCE TO RELATED APPLICATION

This application is a continuation of application Ser. No. 718,928, filed 4/1/85, now abandoned.

BACKGROUND

The present invention relates to the use of a graphics tablet to provide input for a computer system. A prior art graphics tablet might include a platen which contains an x-y grid of wire traces on a pc board. For instance, a graphics tablet model number HP9111A made by Hewlett-Packard Company of Palo Alto, Calif. has 56 traces in the x-direction and 46 traces in the y-direction. Typically in the prior art each trace has required its own trace driving circuitry. This circuitry adds significant cost to the manufacture and design of a graphics tablet.

SUMMARY OF THE INVENTION

In accordance with the preferred embodiment of the present invention, a graphics tablet is presented. A plurality of wires are embedded on the graphics tablet. These wires comprise a series of driver wires, each driver wire being coupled to a plurality of wire traces. The wire traces form an x-y grid on the graphics tablet. When a stylus is placed in contact with the graphics tablet, the location of a sector of the graphics tablet where the stylus contacts the graphics tablet may be determined by sequentially placing a signal on each drive wire and measuring the strength of the signal received by the stylus. The closer the stylus is to a particular trace, the stronger the signal which is received by the stylus from the drive wire coupled to that trace. The identity of a plurality of drive wires in the x-direction direction and a plurality of wires in the y-direction with the strongest received signal can be used to determine a unique address for the location of the sector of the graphics tablet where the stylus contacts the graphics tablet.

Driver circuits are coupled to each drive wire and not directly to each trace wire, thus reducing the number of driver circuits required. This can result in substantial cost reduction over the prior art.

DESCRIPTION OF THE PREFERRED EMBODIMENT

Figure 1:
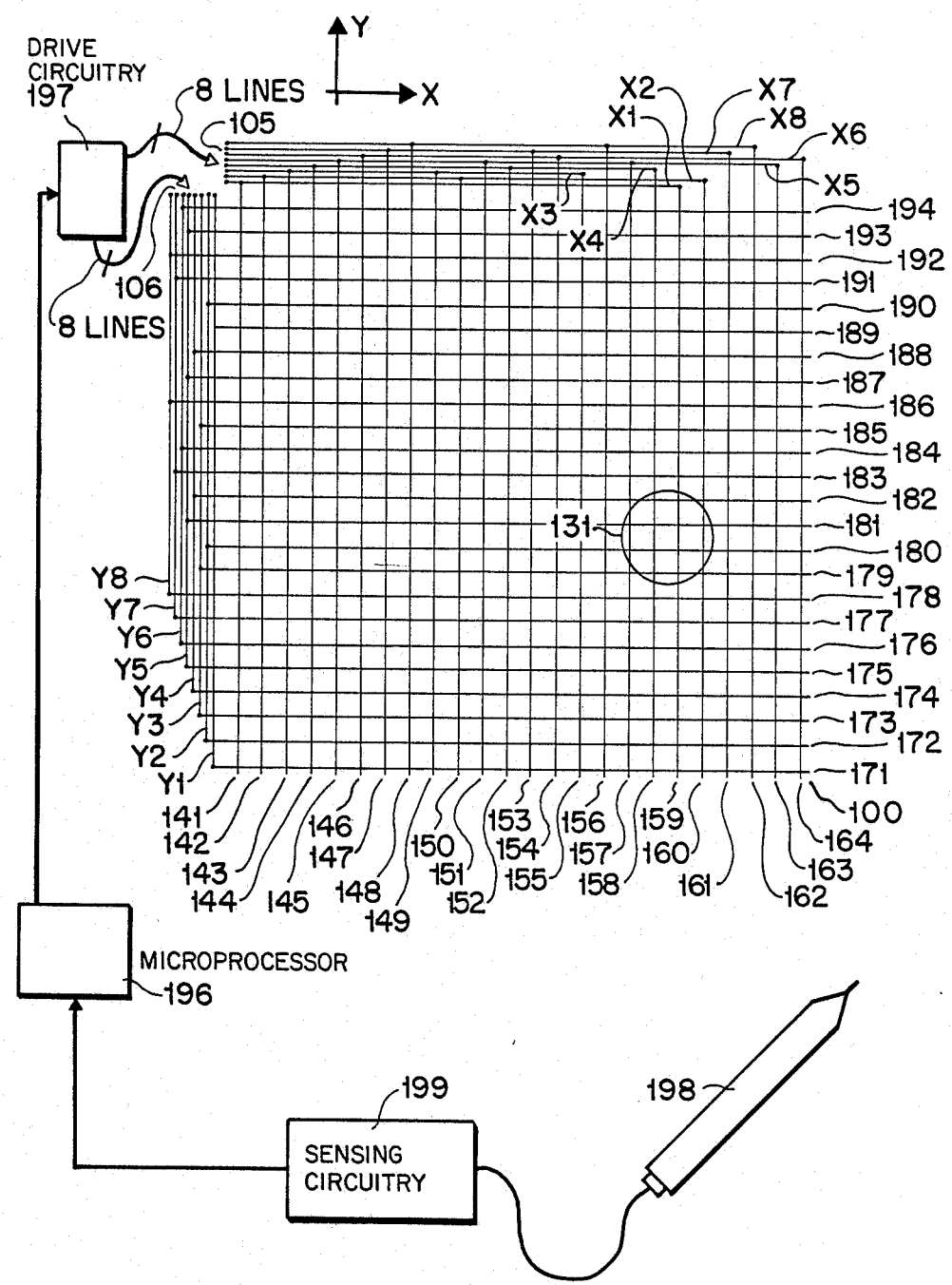
FIG. 1 shows a graphics tablet with an x-y grid of wire traces embedded thereon in accordance with a preferred embodiment of the present invention.

FIG. 1 shows an x-y grid of wire traces organized on a graphics tablet 100. The x-y grid of wire traces includes wire traces 141-164 used to calculate locations in the x-direction and wire traces 171-194 used to calculate locations in the y-direction. Also on graphics tablet 100, a driver wire x1, a driver wire x2, a driver wire x3, a driver wire x4, a driver wire x5, a driver wire x6, a driver wire x7, and a driver wire x8 may be coupled to driver circuitry 197 at driver wire ends 105. A driver wire y1, a driver wire y2, a driver wire y3, a driver wire y4, a driver wire y5, a driver wire y6, a driver wire y7, and a driver wire y8 may be coupled to driver circuitry 197 at driver wire ends 106. Traces 171-194 are coupled to driver wires y1-y8 as shown. Similarly, traces 141-164 are coupled to driver wires x1-x8 as shown.

The following table lists traces 141-164 and indicates which driver wire from driver wires x1-x8 is coupled to each trace.

TABLE 1

| Trace Wire | Driver Wire Connected Thereto |
| --- | --- |
| 141 | x1 |
| 142 | x2 |
| 143 | x3 |
| 144 | x4 |
| 145 | x5 |
| 146 | x6 |
| 147 | x7 |
| 148 | x8 |
| 149 | x3 |
| 150 | x2 |
| 151 | x5 |
| 152 | x4 |
| 153 | x7 |
| 154 | x6 |
| 155 | x3 |
| 156 | x8 |
| 157 | x5 |
| 158 | x4 |
| 159 | x1 |
| 160 | x2 |
| 161 | x7 |
| 162 | x8 |
| 163 | x5 |
| 164 | x6 |

Similarly the following table lists traces 171-194 and indicates which driver wire from driver wires y1-y8 is coupled to each trace.

TABLE 2

| Trace Wire | Driver Wire Connected Thereto |
| --- | --- |
| 171 | y1 |
| 172 | y2 |
| 173 | y3 |
| 174 | y4 |
| 175 | y5 |
| 176 | y6 |
| 177 | y7 |
| 178 | y8 |
| 179 | y3 |
| 180 | y2 |
| 181 | y5 |
| 182 | y4 |
| 183 | y7 |
| 184 | y6 |
| 185 | y3 |
| 186 | y8 |
| 187 | y5 |
| 188 | y4 |
| 189 | y1 |
| 190 | y2 |
| 191 | y7 |
| 192 | y8 |
| 193 | y5 |
| 194 | y6 |

The x-y grid of wire traces interfaces to driver circuitry 197 by means of ends 105 of driver wires x1-x8 and by means of ends 106 of driver wires y1-y8. Driver circuitry 197 is coupled to a microprocessor 196. When a stylus 198 or other signal detecting device is placed on the graphics tablet a coarse location can be determined by sequentially placing a signal on each driver wire x1–x8 and measuring the strength of the signal received by stylus 198. Sensing circuitry 199 coupled to stylus 198 measures the relative strength of the signals and gives this information to microprocessor. For instance, the three driver wires for the x-direction (i.e., wires x1–x8) from which stylus 198 receives the strongest signals are used to determine an address in the x-direction for the sector location of stylus 198. Likewise, the three driver wires for the y-direction (i.e., wires y1–y8) from which stylus 198 receives the strongest signal are used to determine an address in the y-direction for the sector location of stylus 198. A section 131 of array 100 is shown in FIG. 2 for further explanation of how addresses are derived.

Figure 2:
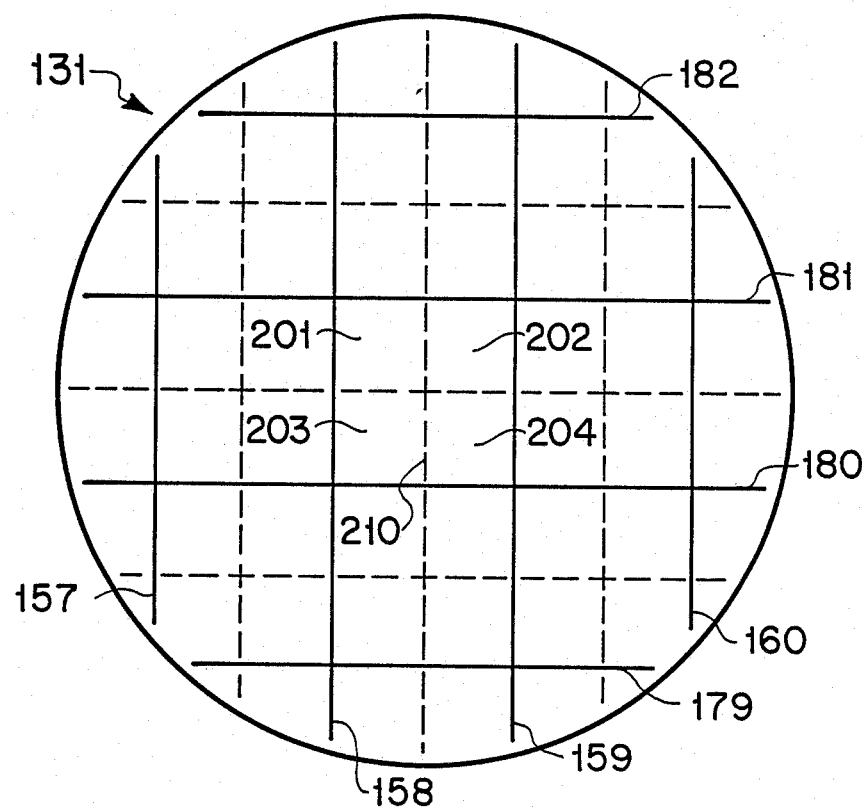
FIG. 2 is an enlarged diagram of a portion of the grid of wire traces shown in FIG. 1.

In FIG. 2, traces 157, 158, 159 and 160 for the x-direction and traces 179, 180, 181, and 182 for the y-direction are shown. From Table 1, trace 157 is coupled to drive wire x5, trace 158 is coupled to drive wire x4, trace 159 is coupled to drive wire x1, and trace 160 is coupled to drive wire x2. From table 2, trace 179 is coupled to drive wire y3, trace 180 is coupled to drive wire y2, trace 181 is coupled to drive wire y5, trace 182 is coupled to drive wire y4.

The strength of the signals coupled from trace wires 141–164 and 171–194 to stylus 198 can be used to determine which sector stylus 198 is placed in. For instance, if stylus 198 is placed in a sector 201, for determination of the x-direction, stylus 198 would be closest to trace 158, second closest to trace 159 and third closest to trace 157. Therefore, for drive wires for the x direction stylus 198 would receive the strongest signal from drive wire x4, the second strongest signal from drive wire x1 and the third strongest signal from drive wire x5. Thus, preserving the order of strongest to third strongest, the address for sector 201 in the x-direction would be x4, x1, x5, or x(415). Likewise, when stylus 198 is in sector 201, for determination of the y-direction, stylus 198 would be closest to trace 181, second closest to trace 180 and third closest to trace 182. Therefore, for drive wires in the y-direction stylus 198 would receive the strongest signal from drive wire y5, the second strongest signal from drive wire y2 and the third strongest signal from drive wire y4. Thus, again preserving the order of strongest to third strongest, the address for sector 201 in the y-direction would be y5,y2,y4, or y(524). The address for sector 201 may thus be written x(415), y(524).

Similarly, the addresses for a sector 202, a sector 203 and a sector 204 may be calculated. The address for sector 202 is x(142), y(524); the address for sector 203 is x(415), y(253); and the address for sector 204 is x(142), y(253).

Care must be taken in selecting the ordering of the coupling of the drive wires to the traces to insure each sector on a board has a unique address. Depending upon the size of the graphics board and the number of driver wires used, it may be desirable to calculate a unique address by using other than three drive wires for each direction (i.e., three drive wires for the x-direction and three drive wires for the y-direction). For instance, the nearest two traces or the nearest four traces may be used to calculate a unique address for each sector in each direction. Also, it would be possible to originate a signal from stylus 198 and detect signals on each of the driver wires. A relatively strong signal received by a particular drive wire would indicate that stylus 198 contacts the graphics board relatively close to a trace wire coupled to that driver wire.

Additionally, traces may be ordered in such a way as to avoid erroneous data. For instance, if stylus 198 is in sector 201 but very close to a border 210 between sector 201 and 202, then the unique address determined in the x direction should be x(415). However, noise in the system might lead to an erroneous determination that the address is x(412). Similarly, if stylus 198 is in sector 202 but very close to border 210, then noise in the system may erroneously lead to the determination that the address in the x direction is x(145) rather than the correct x(142). By proper ordering of the traces so that addresses x(412) and x(145) do not uniquely address another sector, (as has been done in the preferred embodiment), these addresses, although erroneously determined, may still be used to reference the location where stylus 198 is located.

The above discussion has centered on locating a sector in which stylus 198 is located. Once the sector is located, if a more precise location needs to be determined, this can be done using a simple centroid calculation based on the relative strength of signals received from the three nearest traces.

Figure 3:
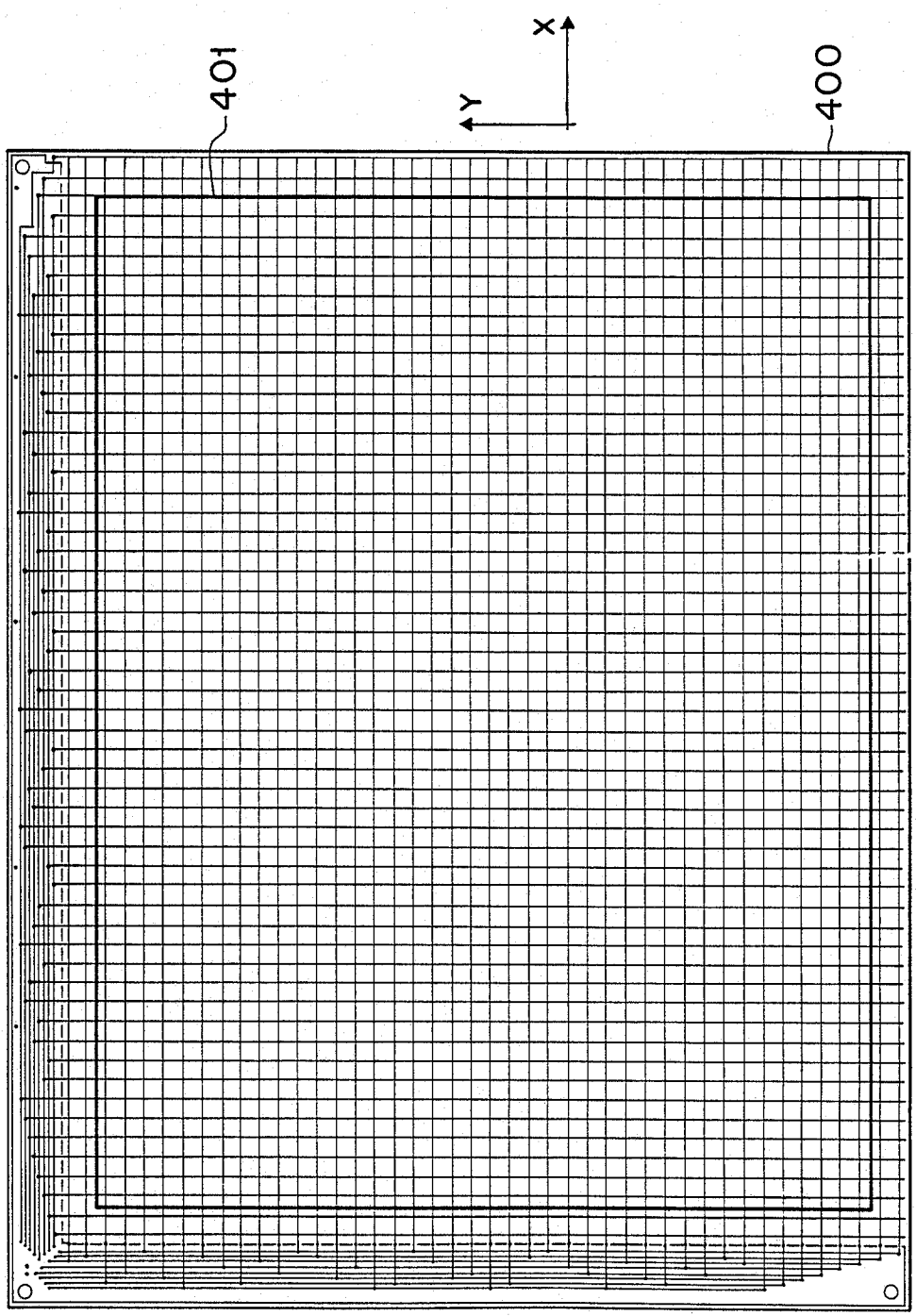
FIG. 3 shows another graphics tablet with an x-y grid of wire traces embedded thereon in accordance with another embodiment of the present invention.

FIG. 3 shows a graphics tablet array 400 using eight driver wires for the x-direction and eight driver wires for the y-direction. There are 56 trace wires for determining location of a stylus in the x-direction and 44 trace wires for determining location of a stylus in the y-direction. Outline section 401 shows the area within which the graphics tablet array 400 is divided into sectors, each sector having a unique address.

We claim:

1. An apparatus useful in the detection of a location of an object on a tablet, the apparatus comprising:
    a first plurality of wire systems, each wire system including a driver wire and at least two traces coupled to the driver wire, the traces being laid out on the tablet;
    detecting means for detecting a first wire system from the first plurality of wire systems which has a trace which is closest to the object, for detecting a second wire system from the first plurality of wire systems which has a trace which is second closest to the object and for detecting a third wire system from the first plurality of wire systems which has a trace which is third closest to the object; and,
    first determining means for determining an address of the location based on the identity of the first, second, and third wire systems.

2. An apparatus as in claim 1 additionally comprising:
    a second plurality of wire systems, each wire system in the second plurality of wire systems including a plurality of traces laid across the tablet wherein the traces from the second plurality of wire systems are perpendicular to the traces from the first plurality of wires.

3. An apparatus as in claim 2 wherein the detecting means additionally
    detects a first wire system from the second plurality of wire system which has a trace which is closest to the object,
    detects a second wire system from the second plurality of wire systems which has a trace which is second closest to the object and
    detects a third wire system from the second plurality of wire systems which has a trace which is third closest to the object; and,
    wherein the first determining means additionally determines a unique address of the location based on the identity of the first, second, and third wire systems.

4. An apparatus for detecting a location of an object on a graphics tablet, the apparatus comprising:
an x-y grid of wire traces including a first plurality of wire traces for the x-direction and a second plurality of wire traces for the y-direction;
a first plurality of wire drivers, each wire driver of the first plurality of wire drivers being coupled to at least two wire traces from the first plurality of wire traces;
a second plurality of wire drivers, each wire driver of the second plurality of wire drivers being coupled to at least two wire traces from the second plurality of wire traces;
signal generation means for generating a signal on each of the first plurality of wire drivers and on each of the second plurality of wire drivers;
detecting means, coupled to the object, for detecting the relative strength at the location of the object on the graphics tablet of the signals generated on each of the first plurality of wire drivers and on each of the second plurality of wire drivers; and,
locating means for locating the object based on the relative strength of signals generated by the signal generation means;
wherein the strongest signal detected by the detecting means which is generated by one of the first plurality of wire drivers is generated by a first wire driver coupled to first wire trace from the first plurality of wire traces that is closest to the location of the object on the graphics tablet, and the second strongest signal detected by the detecting means which is generated by one of the first plurality of wire drivers is generated by a second wire driver coupled to a second wire trace from the first plurality of wire traces that is second closest to the location of the object on the graphics tablet;
wherein the strongest signal detected by the detecting means which is generated by one of the second plurality of wire drivers is generated by a first wire driver coupled to a first wire trace from the second plurality of wire traces that is closest to the location of the object on the graphics tablet, and the second strongest signal detected by the detecting means which is generated by one of the second plurality of wire drivers is generated by a second wire driver coupled to a second wire trace from the second plurality of wire traces that is second closest to the location of the object on the graphics tablet; and,
wherein the locating means determines the location of the object on the graphics tablet based at least partially on the identity of the first wire driver and the second wire driver from the first plurality of wire drivers and the identity of the first wire driver and the second wire driver from the second plurality of wire drivers which generate the strongest and the second strongest signal detected by the detecting means.

5. An apparatus useful in the detection of a location of an object on a tablet, the apparatus comprising:
a first plurality of traces laid on the tablet, the traces being divided into sets of traces wherein each set of traces includes at least two traces, and wherein all traces within each set of traces are electrically coupled together and driven by a driver wire;
detecting means for detecting a first set of traces which has a first trace which is closer to the object than any other trace in the first plurality of traces and for detecting a second set of traces which has a second trace which is closer to the object than any other trace in the first plurality of traces except for the first trace;
first determining means for determining an address of the location based at least partially on the identification of the first set of traces and the second set of traces.

6. An apparatus as in claim 5 additionally comprising:
a second plurality of traces wherein the traces from the second plurality of traces are perpendicular to the traces from the first plurality of traces.

7. An apparatus as in claim 6 wherein the second plurality of traces are divided into sets of traces so that each set of traces includes at least two traces, and so that all traces within each set of traces are electrically coupled together; and wherein the first detecting means additionally detects a first set of traces within the second plurality of traces which has a trace which is closer to the object than any other trace in the second plurality of traces and detects a second set of traces within the second plurality of traces which has a second trace which is closer to the object than any other trace in the second plurality of traces except for the first trace.

* * * * *